(12) United States Patent
Matsubayashi et al.

(10) Patent No.: US 10,158,275 B2
(45) Date of Patent: Dec. 18, 2018

(54) SEPARATION JIG, SEPARATION APPARATUS AND SEPARATION METHOD FOR LAMINATED CORE

(71) Applicant: Mitsui High-tec, Inc., Yahatanishi-ku, Kitakyushu-shi, Fukuoka (JP)

(72) Inventors: Satoshi Matsubayashi, Kitakyushu (JP); Hayato Nakayama, Kitakyushu (JP)

(73) Assignee: MITSUI HIGH-TEC, INC., Yahatanishi-Ku, Kitakyushu-Shi, Fukuoka (JP)

( * ) Notice: Subject to any disclaimer, the term of this patent is extended or adjusted under 35 U.S.C. 154(b) by 156 days.

(21) Appl. No.: 15/255,774

(22) Filed: Sep. 2, 2016

(65) Prior Publication Data

US 2017/0063206 A1 Mar. 2, 2017

(30) Foreign Application Priority Data

Sep. 2, 2015 (JP) ................. 2015-173095

(51) Int. Cl.
| | |
|---|---|
| H01F 3/04 | (2006.01) |
| H01F 7/06 | (2006.01) |
| H02K 15/02 | (2006.01) |
| H02K 1/14 | (2006.01) |

(52) U.S. Cl.
CPC .......... *H02K 15/022* (2013.01); *H02K 1/148* (2013.01); *Y10T 29/49078* (2015.01)

(58) Field of Classification Search
CPC ......... Y10T 29/49009; Y10T 29/49012; Y10T 29/4902; Y10T 29/49078; H02K 1/148; H02K 15/024; H02K 99/20; F03D 1/06

USPC ........ 29/609, 426.1, 596, 598, 603.01, 604, 29/606, 732, 738

See application file for complete search history.

(56) References Cited

U.S. PATENT DOCUMENTS

| | | | | |
|---|---|---|---|---|
| 7,595,578 | B2 * | 9/2009 | Aramaki ............... | H02K 1/148 29/603.01 |
| 8,683,675 | B2 * | 4/2014 | Yuya .................... | H02K 1/148 29/596 |
| 9,520,761 | B2 * | 12/2016 | Matsubayashi ...... | H02K 15/02 |

FOREIGN PATENT DOCUMENTS

JP     2010-081799     4/2010

* cited by examiner

*Primary Examiner* — Thiem Phan
(74) *Attorney, Agent, or Firm* — Procopio, Cory, Hargreaves & Savitch, LLP

(57) ABSTRACT

A separation apparatus for a laminated core is configured to separate an annular laminated core, which includes a plurality of core pieces each of which includes a yoke portion and a tooth portion extending from the yoke portion in a direction intersecting the yoke portion and is integrated by the temporary connection of the adjacent core pieces at end portions of the yoke portions, into the respective core pieces. The separation apparatus includes a plurality of separation members that are movable in a radial direction of the laminated core and are disposed so as to be arranged in a circumferential direction of the laminated core, and an actuator that is configured to apply an outward force in the radial direction to the laminated core through the respective separation members by moving the respective separation members outward in the radial direction.

11 Claims, 10 Drawing Sheets

SEPARATION JIG, SEPARATION APPARATUS AND SEPARATION METHOD FOR LAMINATED CORE

CROSS-REFERENCE TO RELATED APPLICATIONS

This application is based upon and claims the benefit of priority from Japanese Patent Application No. 2015-173095, filed Sep. 2, 2015, the entire contents of which are incorporated herein by reference.

BACKGROUND

1. Field

The present disclosure relates to a separation jig, a separation apparatus and a separation method of separating a laminated core, particularly, a split laminated core, which is split into a plurality of core pieces, into the respective core pieces.

2. Disclosure of the Related Art

A laminated core is a component of a motor (electric motor). The laminated core is obtained by stacking and fastening a plurality of electromagnetic steel sheets that are processed into a predetermined shape. The laminated core generally includes an annular yoke portion and a plurality of tooth portions that extend from the yoke portion in a direction intersecting the yoke portion. In order to obtain a motor, a predetermined number of turns of a wire are wound on each tooth portion. However, since an interval between adjacent tooth portions is generally narrow, work for winding a wire on the tooth portion tends to be difficult.

Accordingly, Japanese Unexamined Patent Publication No. 2010-081799 discloses a method of manufacturing a laminated core that includes a step of forming a plurality of core pieces each of which includes a yoke portion and a tooth portion extending from the yoke portion in a direction intersecting the yoke portion, a step of winding a wire on each tooth portion, and a step of obtaining an annular laminated core by assembling the respective core pieces so that the adjacent yoke portions are connected to each other.

SUMMARY

A separation jig for a laminated core according to one aspect of the disclosure is configured to separate an annular laminated core, which includes a plurality of core pieces each of which includes a yoke portion and a tooth portion extending from the yoke portion in a direction intersecting the yoke portion and is integrated by the temporary connection of the adjacent core pieces at end portions of the yoke portions, into the respective core pieces. The separation jig includes a plurality of separation members that are movable in a radial direction of the laminated core by an actuator and are disposed so as to be arranged in a circumferential direction of the laminated core.

A separation apparatus for a laminated core according to another aspect of the disclosure is configured to separate an annular laminated core, which includes a plurality of core pieces each of which includes a yoke portion and a tooth portion extending from the yoke portion in a direction intersecting the yoke portion and is integrated by the temporary connection of the adjacent core pieces at end portions of the yoke portions, into the respective core pieces. The separation apparatus includes a plurality of separation members that are movable in a radial direction of the laminated core and are disposed so as to be arranged in a circumferential direction of the laminated core, and an actuator that is configured to apply an outward force in the radial direction to the laminated core through the respective separation members by moving the respective separation members outward in the radial direction.

A separation method for a laminated core according to still another aspect of the disclosure includes: a first step of disposing a laminated core and a plurality of separation members so that the plurality of separation members being movable in a radial direction of the laminated core and disposed so as to be arranged in a circumferential direction of the laminated core are positioned in a space formed at a central portion of the annular laminated core, which includes a plurality of core pieces each of which includes a yoke portion and a tooth portion extending from the yoke portion in a direction intersecting the yoke portion and is integrated by the temporary connection of the adjacent core pieces at end portions of the yoke portions; and a second step of applying an outward force in the radial direction to the laminated core through the respective separation members by moving the respective separation members outward in the radial direction by an actuator.

DETAILED DESCRIPTION

[1] Outline of Embodiment

Figure 1:
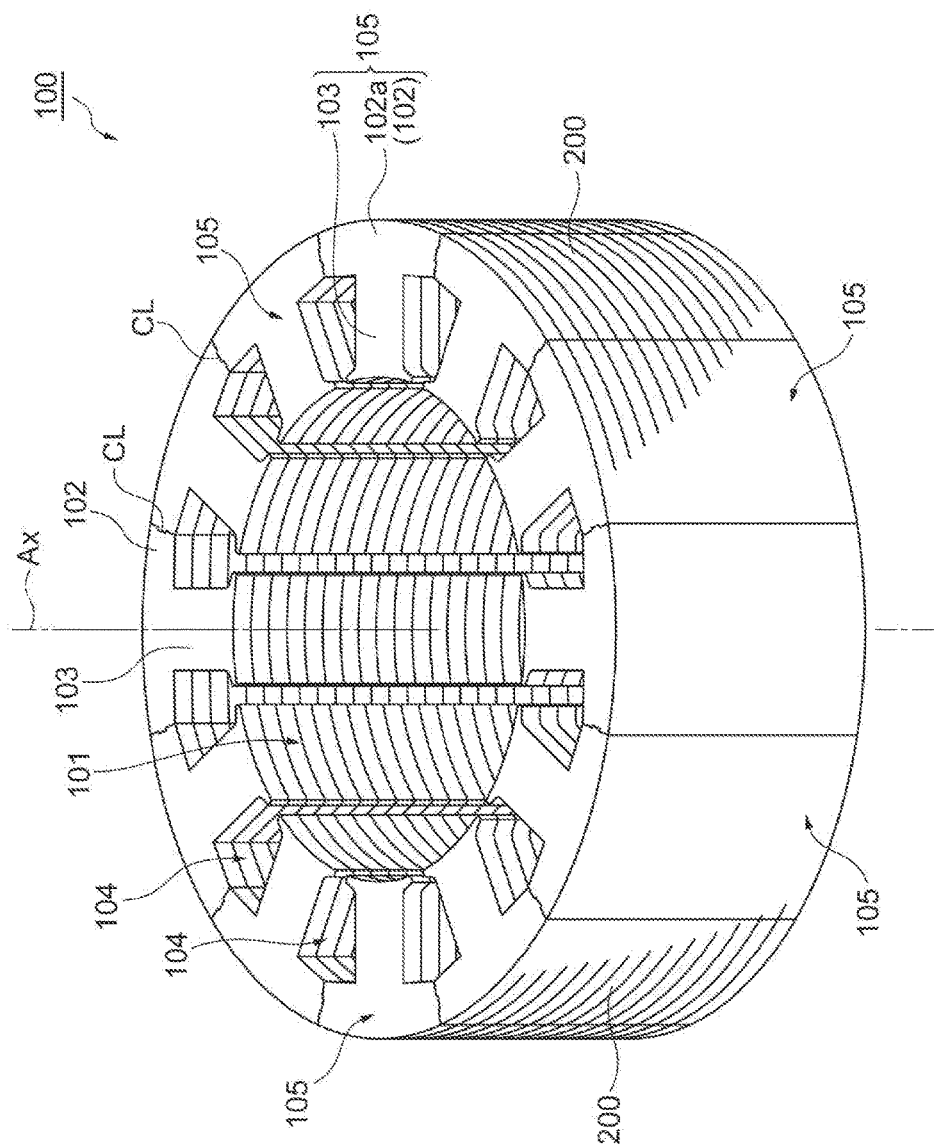
FIG. 1 is a perspective view illustrating an example of a laminated core.

Since an embodiment according to the disclosure to be described below is illustrative to describe the invention, the invention should not be limited to the following contents.

A separation jig for a laminated core according to one aspect of this embodiment is configured to separate an annular laminated core, which includes a plurality of core pieces each of which includes a yoke portion and a tooth portion extending from the yoke portion in a direction intersecting the yoke portion and is integrated by the temporary connection of the adjacent core pieces at end portions of the yoke portions, into the respective core pieces. The separation jig includes a plurality of separation members that are movable in a radial direction of the laminated core by an actuator and are disposed so as to be arranged in a circumferential direction of the laminated core.

In the separation jig for a laminated core according to the aspect of this embodiment, the plurality of separation members are movable in the radial direction of the laminated core by the actuator and are disposed so as to be arranged in the circumferential direction of the laminated core. Therefore, when the respective separation members are moved outward in the radial direction by the actuator, an outward force in the radial direction is substantially simultaneously and substantially uniformly applied to the respective core pieces of the laminated core by the respective separation members. Accordingly, the laminated core is substantially simultaneously divided into the respective core pieces only by moving the respective separation members by the actuator. As a result, the laminated core can be easily divided into the core pieces in a short time.

The separation jig for a laminated core according to the aspect of this embodiment may further include a shaft that is configured to be driven by the actuator, each separation member may have an inner peripheral surface which is positioned on the inside in the radial direction and is inclined with respect to a central axis of the laminated core, and the shaft may include a conical surface having a shape corresponding to the respective inner peripheral surfaces. In this case, when the shaft is pressed against the respective separation members by the actuator, the conical surface of the shaft applies an outward force to the respective inner peripheral surfaces while sliding on the respective inner peripheral surfaces. The respective separation members, therefore, are pushed in the radial direction. Accordingly, the respective separation members can be moved outward in the radial direction by a very simple structure.

The separation jig for a laminated core according to the aspect of this embodiment may further include a guide member that includes protrusions protruding from the surface thereof, each separation member may have a surface which faces the guide member and have an opening extending in the radial direction, and the protrusions may be inserted into the openings. In this case, the separation members are guided in the extending direction of the openings by the protrusions inserted into the openings. The respective separation members, therefore, can be reliably guided in the radial direction by a very simple structure.

The separation jig for a laminated core according to the aspect of this embodiment may further include at least one restricting member which is disposed in a slot defined between the adjacent tooth portions of the core pieces. In this case, the wobble of the laminated core in the circumferential direction is suppressed by the restricting member. An outward force in the radial direction, therefore, effectively acts on each core piece from each separation member. Accordingly, the laminated core can be more smoothly divided into the core pieces.

The respective separation members may be disposed so as to correspond to the respective tooth portions one to one. In this case, an outward force in the radial direction is more uniformly applied to the respective core pieces of the laminated core by the respective separation members. The intensive application of a force to a specific core piece, therefore, is suppressed. Accordingly, the laminated core can be much more smoothly divided into the core pieces.

A separation apparatus for a laminated core according to another aspect of this embodiment is configured to separate an annular laminated core, which includes a plurality of core pieces each of which includes a yoke portion and a tooth portion extending from the yoke portion in a direction intersecting the yoke portion and is integrated by the temporary connection of the adjacent core pieces at end portions of the yoke portions, into the respective core pieces. The separation apparatus includes a plurality of separation members that are movable in a radial direction of the laminated core and are disposed so as to be arranged in a circumferential direction of the laminated core, and an actuator that is configured to apply an outward force in the radial direction to the laminated core through the respective separation members by moving the respective separation members outward in the radial direction.

In the separation apparatus for a laminated core according to another aspect of this embodiment, an outward force in the radial direction is applied to the laminated core through the respective separation members when the respective separation members are moved outward in the radial direction by the actuator. Therefore, an outward force in the radial direction is substantially simultaneously and substantially uniformly applied to the respective core pieces of the laminated core by the respective separation members. Accordingly, the laminated core is substantially simultaneously divided into the respective core pieces only by moving the respective separation members by the actuator. As a result, the laminated core can be easily divided into the core pieces in a short time.

Each separation member may have an inner peripheral surface which is positioned on the inside in the radial direction and is inclined with respect to a central axis of the laminated core; and the actuator may include a shaft that includes a conical surface having a shape corresponding to the respective inner peripheral surfaces, and a pressing machine that presses the shaft against the respective separation members in a state in which the conical surface is in contact with the respective inner peripheral surfaces. In this case, when the shaft is pressed against the respective separation members by the pressing machine, the conical surface of the shaft applies an outward force to the respective inner peripheral surfaces while sliding on the respective inner peripheral surfaces. The respective separation members, therefore, are pushed in the radial direction. Accordingly, the respective separation members can be moved outward in the radial direction by a very simple structure.

The separation apparatus for a laminated core according to another aspect of this embodiment may further include a guide member that includes protrusions protruding from the surface thereof, each separation member may have a surface which faces the guide member and have an opening extending in the radial direction; and the protrusions may be inserted into the openings. In this case, the separation members are guided in the extending direction of the openings by the protrusions inserted into the openings. The respective separation members, therefore, can be reliably guided in the radial direction by a very simple structure.

The separation apparatus for a laminated core according to another aspect of this embodiment may further include at least one restricting member which is disposed in a slot defined between the adjacent tooth portions of the core pieces. In this case, the wobble of the laminated core in the circumferential direction is suppressed by the restricting member. An outward force in the radial direction, therefore, effectively acts on each core piece from each separation member. Accordingly, the laminated core can be more smoothly divided into the core pieces.

The respective separation members may be disposed so as to correspond to the respective tooth portions one to one. In this case, an outward force in the radial direction is more uniformly applied to the respective core pieces of the laminated core by the respective separation members. The intensive application of a force to a specific core piece, therefore, is suppressed. Accordingly, the laminated core can be much more smoothly divided into the core pieces.

A separation method for a laminated core according to still another aspect of this embodiment includes: a first step of disposing a laminated core and a plurality of separation members so that the plurality of separation members being movable in a radial direction of the laminated core and disposed so as to be arranged in a circumferential direction of the laminated core are positioned in a space formed at a central portion of the annular laminated core, which includes a plurality of core pieces each of which includes a yoke portion and a tooth portion extending from the yoke portion in a direction intersecting the yoke portion and is integrated by the temporary connection of the adjacent core pieces at end portions of the yoke portions; and a second step of applying an outward force in the radial direction to the laminated core through the respective separation members by moving the respective separation members outward in the radial direction by an actuator.

In the separation method for a laminated core according to still another aspect of this embodiment, an outward force in the radial direction is applied to the laminated core through the respective separation members when the respective separation members are moved outward in the radial direction by the actuator in the second step. An outward force in the radial direction, therefore, is substantially simultaneously and substantially uniformly applied to the respective core pieces of the laminated core by the respective separation members. Accordingly, the laminated core is substantially simultaneously divided into the respective core pieces only by moving the respective separation members by the actuator. As a result, the laminated core can be easily divided into the core pieces in a short time.

In the second step, an outward force in the radial direction may be applied to the laminated core through the respective separation members by moving the respective separation members outward in the radial direction by the actuator, the respective separation members being configured to be guided in the radial direction by a guide member. In this case, each separation member can be more reliably moved outward in the radial direction by the guide member. An outward force in the radial direction, therefore, more effectively acts on the laminated core. Accordingly, the laminated core can be more smoothly divided into the core pieces.

In the second step, an outward force in the radial direction may be applied to the laminated core through the respective separation members by moving the respective separation members outward in the radial direction by the actuator in a state in which the movement of the laminated core in the circumferential direction is restricted by at least one restricting member. In this case, the wobble of the laminated core in the circumferential direction is suppressed by the restricting member. An outward force in the radial direction, therefore, effectively acts on each core piece from each separation member. Accordingly, the laminated core can be much more smoothly divided into the core pieces.

[2] Illustration of Embodiment

An example of the embodiment according to the disclosure will be described in more detail below with reference to the drawings. In the following description, the same elements or elements having the same functions are denoted by the same reference numerals and the repeated description thereof will be omitted.

[Structure of Laminated Core]

First, the structure of a laminated core 100 will be described with reference to FIGS. 1 and 2. The laminated core 100 is, for example, a stator of a motor. As illustrated in FIG. 1, the laminated core 100 has a cylindrical shape. That is, the laminated core 100 has an annular shape when being viewed in the direction of a central axis Ax thereof. A through hole 101 is provided at the central portion of the laminated core 100 and extends along the central axis Ax. A rotor of a motor can be disposed in the through hole 101.

The laminated core 100 includes a yoke portion 102 and a plurality of tooth portions 103. The yoke portion 102 has an annular shape and extends so as to surround the central axis Ax. The width of the yoke portion 102 in a radial direction may have various sizes according to the use and performance of the motor, but may be in the range of, for example, about 2 mm to 40 mm.

Each tooth portion 103 extends in the radial direction of the yoke portion 102 toward the central axis Ax from the inner edge of the yoke portion 102. That is, each tooth portion 103 protrudes toward the central axis Ax from the inner edge of the yoke portion 102. In the laminated core 100 illustrated in FIG. 1, twelve tooth portions 103 are formed integrally with the yoke portion 102.

The respective tooth portions 103 are arranged at substantially regular intervals in the circumferential direction of the yoke portion 102. In a case in which the laminated core 100 is formed as a motor, a wire (not illustrated) is wound on each tooth portion 103 by a predetermined number of turns. A slot 104 is defined between the adjacent tooth portions 103 and functions as a space for disposing the wire.

Figure 2:
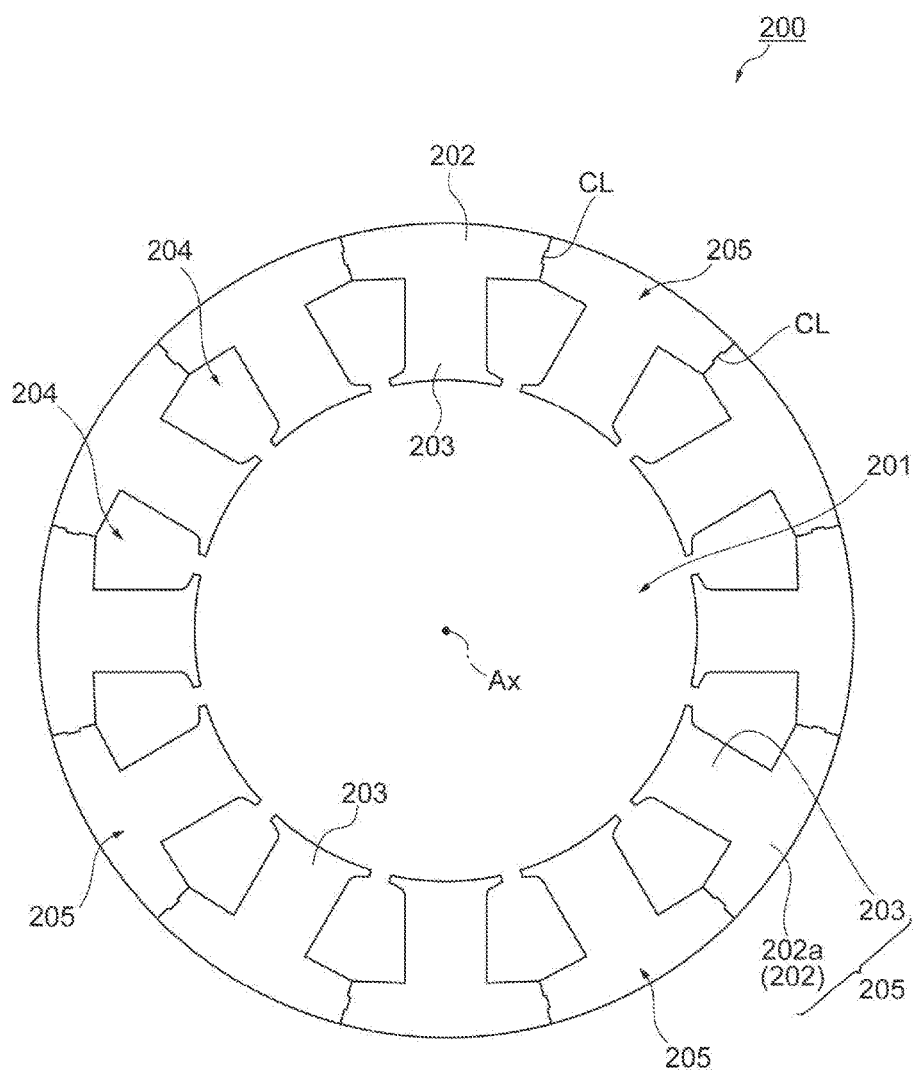
FIG. 2 is a top view illustrating a workpiece forming the laminated core of FIG. 1.

The laminated core 100 is constituted of a plurality of workpieces 200 illustrated in FIG. 2. Specifically, the laminated core 100 is obtained by stacking the plurality of workpieces 200 and fastening them. Various publicly known methods may be employed to fasten the plurality of workpieces 200. The plurality of workpieces 200 may be fastened by, for example, joining using an adhesive or a resin material, using swaged areas, using welding, or the like. In terms of low cost and working efficiency, the plurality of workpieces 200 may be fastened by using swaged areas or welding. On the other hand, in terms of expression of high torque and low iron loss in a motor, the plurality of workpieces 200 may be fastened by joining using an adhesive or a resin material. After temporarily-interlocking is provided on the workpieces 200 and a laminated body is obtained by fastening the plurality of workpieces 200 through the temporarily-interlocking, the laminated core 100 may be obtained by removing the temporarily-interlocking from the laminated body. Meanwhile, "temporarily-interlocking" means a swaged area that is used to temporarily integrate the plurality of workpieces 200 and is removed during the course of the manufacture of a product (the laminated core 100).

The workpiece 200 is obtained by performing (for example, punching, cutting-and-bending, and the like) on, for example, a workpiece plate (electromagnetic steel sheet). In a case in which temporarily-interlocking is not provided on the workpiece 200, the shape of the workpiece 200 when viewed in the direction of the central axis Ax is substantially the same as the shape of the laminated core 100 when viewed in the direction of the central axis Ax (see FIGS. 1 and 2). The workpiece 200, therefore, also has an annular shape when viewed in the direction of the central axis Ax as illustrated in FIG. 2. A through hole 201 is provided at the central portion of the workpiece 200.

The workpiece 200 includes a yoke portion 202 and a plurality of tooth portions 203. The yoke portion 202 has an annular shape and extends so as to surround the central axis Ax. The width of the yoke portion 202 in a radial direction is substantially the same as the width of the yoke portion 102 in the radial direction.

The yoke portion 202 is provided with a plurality of cutting lines CL. In the workpiece 200 illustrated in FIG. 2, the yoke portion 202 is provided with twelve cutting lines CL. Each cutting line CL extends in the radial direction of the yoke portion 202 so as to cross the yoke portion 202. The respective cutting lines CL are arranged at substantially regular intervals in the circumferential direction of the yoke portion 202. Each cutting line CL may be formed by, for example, cutting-and-bending or punching a workpiece plate (electromagnetic steel sheet), pushing back the cut-and-bent portion or the punched portion, and then pressing such portion into the original workpiece plate. When the workpiece plate is cut-and-bent or punched, the cut-and-bent portion or the punched portion is plastically deformed and slightly extends. Accordingly, when such portion is pressed into the original workpiece plate, such portion and the original workpiece plate are tightly fitted to each other so as not to be easily separated from each other by hands.

The shape of the cutting line CL is not limited to an uneven shape illustrated in FIGS. 1 and 2, and may be various shapes, such as a linear shape, a curved shape, a crank-like shape, an arc shape, and a circular arc shape, as long as the cutting line CL crosses between an outer peripheral edge and an inner peripheral edge of the yoke portion 202. In a case in which the shape of the cutting line CL is a linear shape, the cutting line CL may extend in the radial direction of the yoke portion 202 or may extend so as to be inclined with respect to the radial direction of the yoke portion 202 by a predetermined angle. In a case in which the shape of the cutting line CL is a linear shape, the yoke portion 202 tends to be easily divided into several pieces at the cutting lines CL by a small force.

Each tooth portion 203 extends in the radial direction of the yoke portion 202 toward the central axis Ax from the inner edge of the yoke portion 202. That is, each tooth portion 203 protrudes toward the central axis Ax from the inner edge of the yoke portion 202. In this embodiment, twelve tooth portions 203 are formed integrally with the yoke portion 202.

The respective tooth portions 203 are arranged at substantially regular intervals in the circumferential direction of the yoke portion 202. Each tooth portion 203 is positioned between adjacent cutting lines CL in the circumferential direction of the yoke portion 202. A slot 204 is defined between the adjacent tooth portions 203 and functions as a space for disposing the wire.

In a case in which the workpiece 200 is divided into several pieces at the cutting lines CL, a plurality of plate pieces 205 (twelve plate pieces 205 in FIG. 2) are obtained from one workpiece 200. In other words, the workpiece 200 can also be called a combination in which the plurality of plate pieces 205 are combined. One plate piece 205 includes one yoke portion 202a and one tooth portion 203. The yoke portion 202a is a part of the yoke portion 202 when the yoke portion 202 is separated at the cutting lines CL. Accordingly, the workpiece 200 is an integrated body that the plate pieces 205 adjacent to each other in the circumferential direction of the central axis Ax are integrated by the temporary connection at end portions (the cutting lines CL) of the yoke portions 202a.

The laminated core 100 is obtained by stacking the plurality of workpieces 200 so that the yoke portions 202 overlap each other, the tooth portions 203 overlap each other, and the cutting lines CL overlap each other and fastening the workpieces 200. Therefore, when a predetermined force is applied to the laminated core 100 so that the laminated core 100 is divided into several pieces at the cutting lines CL, a plurality of core pieces 105 (twelve core pieces 105 in FIG. 1) are obtained from one laminated core 100. In other words, the laminated core 100 is also a combination in which the plurality of core pieces 105 are combined. One core piece 105 includes one yoke portion 102a and one tooth portion 103. The yoke portion 102a is a part of the yoke portion 102 when the yoke portion 102 is separated at the cutting lines CL. Accordingly, the laminated core 100 is an integrated core that the core pieces 105 adjacent to each other in the circumferential direction of the central axis Ax are integrated by the temporary connection at end portions (the cutting lines CL) of the yoke portions 102a.

[Separation Apparatus]

Next, the structure of a separation apparatus 1 for separating (dividing) the laminated core 100 into the respective core pieces 105 will be described with reference to FIGS. 3 and 4. The separation apparatus 1 includes a holding plate 10 (guide member), an actuator 20, a plurality of guide shafts 30, a plurality of restricting members 40 and a plurality of separation members 50.

The holding plate 10 is a plate-like member having a rectangular shape. The holding plate 10 is configured to hold the placed laminated core 100. The holding plate 10 is provided with a through hole 11, a plurality of through holes 12, a plurality of through holes 13, and a plurality of guide pins 14 (protrusions).

The through hole 11 is positioned at a central portion of the holding plate 10. The through hole 11 has a circular shape. The plurality of through holes 12 are positioned around the through hole 11. In this embodiment, four through holes 12 are positioned at corners of the holding plate 10, respectively. The through holes 12 have a circular shape.

The plurality of through holes 13 surround the through hole 11 and are positioned inside the plurality of through holes 12. In this embodiment, twelve through holes 13 surround the through hole 11. The respective through holes 13 are arranged in a circular shape at substantially regular intervals in the circumferential direction of the through hole 11. Each through hole 13 has a trapezoidal shape. A short side of a pair of bottom sides of the through hole 13 is positioned close to the through hole 11, and a long side of the pair of bottom sides of the through hole 13 is positioned close to the outer edge of the holding plate 10. That is, the space of the through hole 13 becomes narrower toward the through hole 11.

Figure 3:
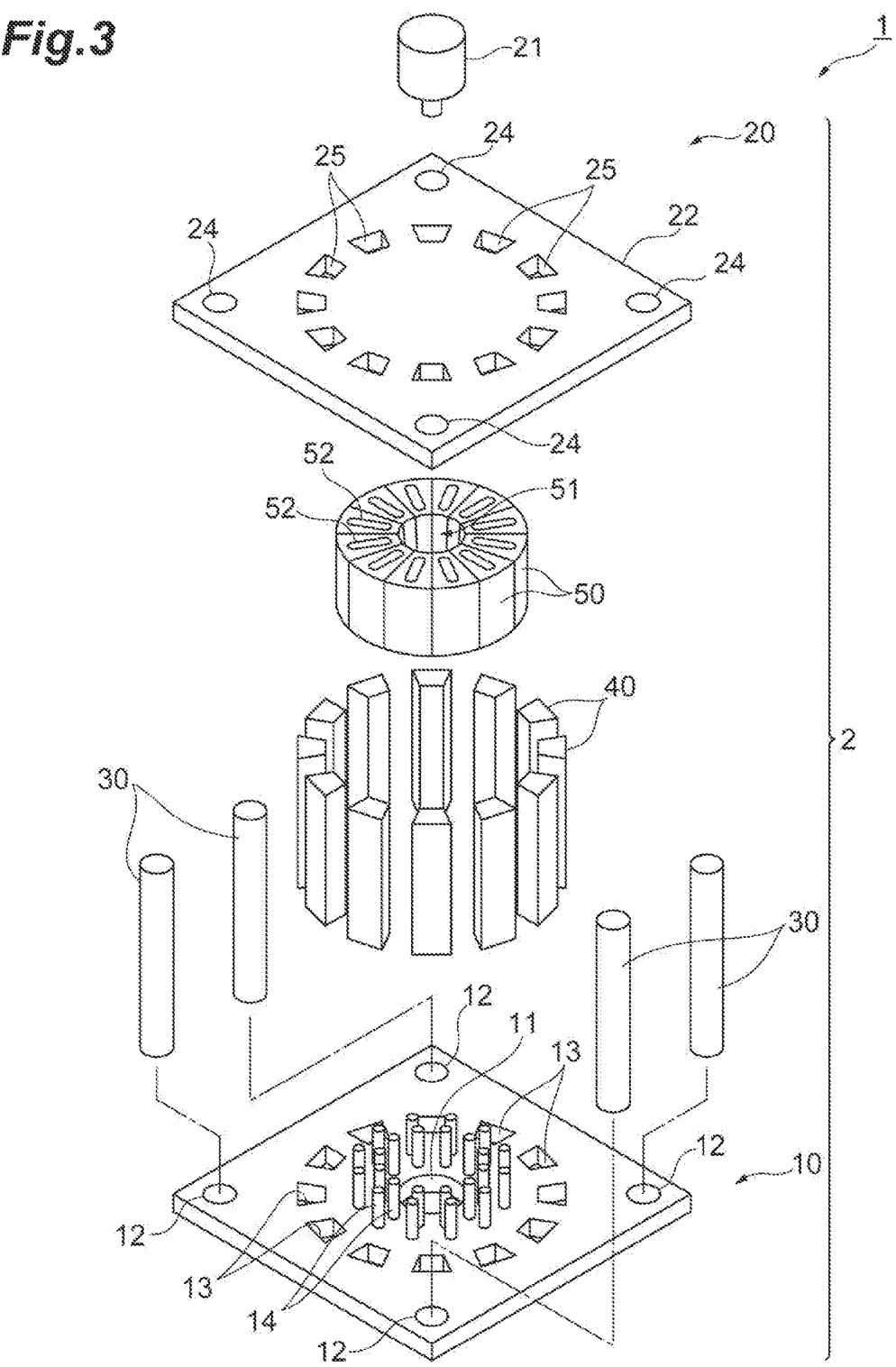
FIG. 3 is an exploded perspective view illustrating a separation apparatus for the laminated core.

The plurality of guide pins 14 protrude from the surface of the holding plate 10 toward the upper side of FIG. 3. The plurality of guide pins 14 have a columnar shape. The plurality of guide pins 14 are positioned between the through hole 11 and the through holes 13. The plurality of guide pins 14 are radially arranged outward from the through hole 11. In this embodiment, pairs of guide pins 14 are arranged outward from the through hole 11, and sets of a pair of guide pins 14 are arranged in a circular shape at substantially regular intervals in the circumferential direction of the through hole 11. Twelve sets of a pair of guide pins 14 are present in this embodiment. In plan view, virtual straight lines connecting the sets of the pair of guide pins 14 do not intersect the through holes 13. That is, the through holes 13 and the sets of the pair of guide pins 14 are alternately arranged in the circumferential direction of the through hole 11.

The guide pins 14 may be formed integrally with the holding plate 10, or may be formed separately from the holding plate 10. In a case in which the guide pins 14 are formed separately from the holding plate 10, for example, base end portions of the guide pins 14 may be mounted in holes provided in the holding plate 10.

The actuator 20 includes a pressing machine 21 and an upper plate 22 (guide member). The pressing machine 21 is configured to press the upper plate 22 so that the upper plate 22 approaches the holding plate 10. The pressing machine 21 may be, for example, a linear motion mechanism, such as an air cylinder, a hydraulic cylinder, or an electric cylinder. The pressing machine 21 may be configured to separate the upper plate 22 from the holding plate 10. That is, the pressing machine 21 may move the upper plate 22 so that the upper plate 22 approaches and is separated from the holding plate 10.

Figure 4:
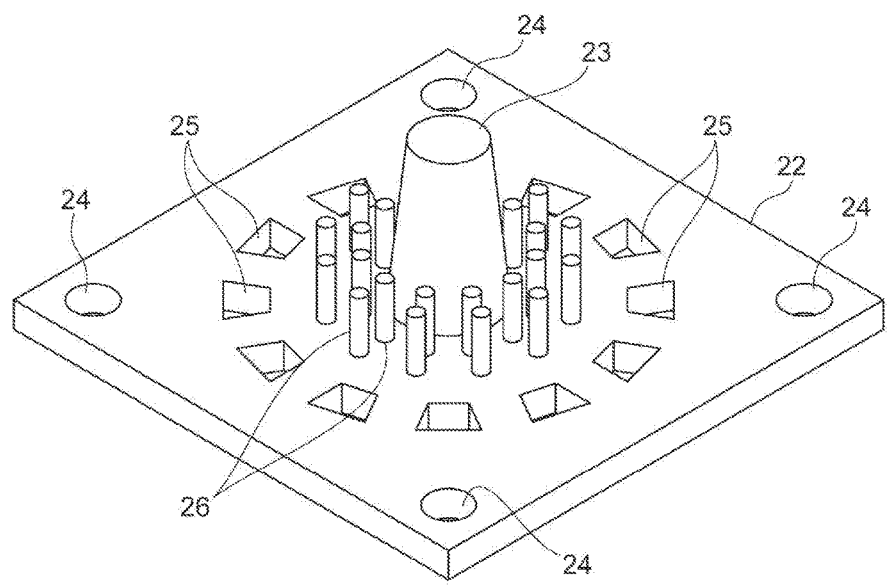
FIG. 4 is a perspective view illustrating a lower surface side of an upper plate.

As illustrated in FIGS. 3 and 4, the upper plate 22 is a plate-like member having a rectangular shape. The upper plate 22 is provided with a pressing shaft 23 (shaft), a plurality of through holes 24, a plurality of through holes 25 and a plurality of guide pins 26 (protrusions).

The pressing shaft 23 is positioned at the central portion of the upper plate 22. The pressing shaft 23 protrudes from the surface of the upper plate 22 toward the upper side of FIG. 4. The pressing shaft 23 has the shape of a truncated cone of which the diameter is reduced toward a tip. The peripheral surface of the pressing shaft 23, therefore, has the shape of a conical surface.

The pressing shaft 23 may be formed integrally with the upper plate 22 or may be formed separately from the upper plate 22. In a case in which the pressing shaft 23 is formed separately from the upper plate 22, for example, a base end portion of the pressing shaft 23 may be mounted in a hole provided in the upper plate 22.

The plurality of through holes 24 are positioned around the pressing shaft 23. In this embodiment, four through holes 24 are positioned at corners of the upper plate 22, respectively.

The plurality of through holes 25 surround the pressing shaft 23 and are positioned inside the plurality of through holes 24. In this embodiment, twelve through holes 25 surround the pressing shaft 23. The respective through holes 25 are arranged in a circular shape at substantially regular intervals in the circumferential direction of the pressing shaft 23. Each through hole 25 has the same shape and size as the through hole 13. A short side of a pair of bottom sides of the through hole 25 is positioned close to the pressing shaft 23, and a long side of the pair of bottom sides of the through hole 25 is positioned close to the outer edge of the upper plate 22. That is, the space of the through hole 25 becomes narrower toward the pressing shaft 25.

The plurality of guide pins 26 protrude from the same surface of the upper plate 22 as the pressing shaft 23 toward the upper side of FIG. 4. The plurality of guide pins 26 have a columnar shape. The plurality of guide pins 26 are positioned between the pressing shaft 23 and the through holes 25. The plurality of guide pins 26 are radially arranged outward from the pressing shaft 23. In this embodiment, pairs of guide pins 26 are arranged outward from the pressing shaft 23, and sets of a pair of guide pins 26 are arranged in a circular shape at substantially regular intervals in the circumferential direction of the pressing shaft 23. Twelve sets of a pair of guide pins 26 are present in this embodiment. In plan view, virtual straight lines connecting the sets of the pair of guide pins 26 do not intersect the through holes 25. That is, the through holes 25 and the sets of the pair of guide pins 26 are alternately arranged in the circumferential direction of the pressing shaft 23.

The guide pins 26 may be formed integrally with the upper plate 22, or may be formed separately from the upper plate 22. In a case in which the guide pins 26 are formed separately from the upper plate 22, for example, base end portions of the guide pins 26 may be mounted in holes provided in the upper plate 22.

The plurality of guide shafts 30 have a columnar shape. In this embodiment, the separation apparatus 1 includes four guide shafts 30 of which the number is the same as the number of each of the through holes 12 and 24. The diameter of the guide shaft 30 is substantially the same as the diameter of the through hole 12, but is slightly smaller than the diameter of the through hole 24. The guide shafts 30 are press-fitted to the through holes 12 of the holding plate 10, respectively. The holding plate 10, therefore, is not moved relative to the respective guide shafts 30. The guide shafts 30 can be inserted into the through holes 24 of the upper plate 22, respectively. The upper plate 22, therefore, can be moved along the guide shafts 30 in a state in which the guide shafts 30 are inserted into the through holes 24.

The plurality of restricting members 40 have a trapezoidal columnar shape. That is, the restricting members 40 are a prismatic column of which a pair of bottom faces have a trapezoidal shape. In this embodiment, the separation apparatus 1 includes twelve restricting members 40 of which the number is the same as the number of each of the through holes 13 and 25. In plan view, the outer shape of the restricting member 40 is substantially the same as that of each of the through holes 13 and 25 or is slightly smaller than that of each of the through holes 13 and 25. The restricting members 40 can be inserted into the through holes 13 of the holding plate 10, respectively. The restricting members 40 can be inserted into the through holes 25 of the upper plate 22, respectively. The holding plate 10 and the upper plate 22 can be moved along the restricting members 40 in a state in which the restricting members 40 are inserted into the through holes 13 and 25.

Figure 6:
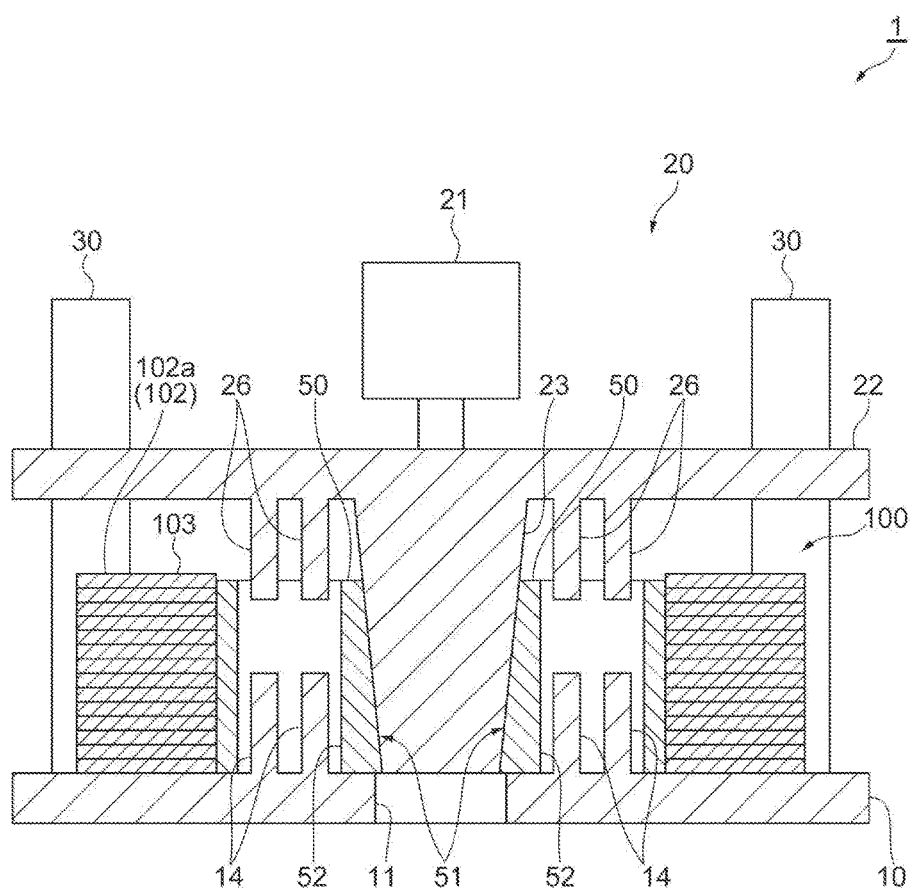
FIG. 6 is a cross-sectional view illustrating the state in which the laminated core mounted on the separation apparatus is not yet separated and which is viewed from the side.
Figure 8:
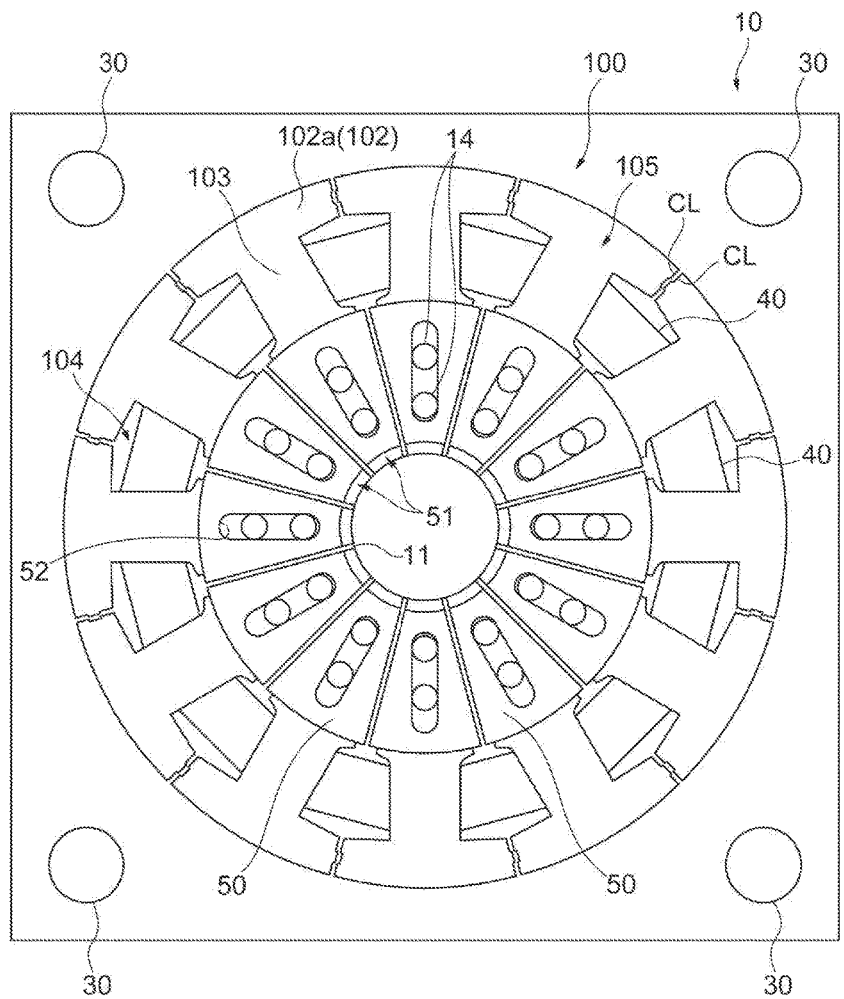
FIG. 8 is a top view illustrating the state in which the laminated core mounted on the separation apparatus has been separated and from which the actuator is omitted.

The plurality of separation members 50 have the shape of a fan. The separation members 50 can be obtained by splitting, for example, an annular column member into a plurality of pieces. In more detail, each of a pair of bottom faces of the separation member 50h facing the holding plate 10 and the upper plate 22 includes a circular arc-shaped outer peripheral edge, a circular arc-shaped inner peripheral edge that is shorter than the outer peripheral edge, a straight line that connects one end of the outer peripheral edge to one end of the inner peripheral edge, and a straight line that connects the other end of the outer peripheral edge to the other end of the inner peripheral edge. An inner peripheral surface 51 of the separation member 50 is an inclined surface becoming closer to the inside toward the lower side of FIG. 3, as illustrated in FIGS. 6 and 8. The shape of the inner peripheral surface 51 corresponds to the peripheral surface of the pressing shaft 23.

The separation member 50 is provided with a through hole 52 (opening). The through hole 52 extends in the height direction of the separation member 50, that is, an opposing direction of the pair of bottom faces. The through hole 52 has the shape of an elongated hole that extends between the inner peripheral surface and the outer peripheral surface of the separation member 50. The width of the through hole 52 is substantially the same as the diameter of each of the guide pins 14 and 26 or is slightly larger than the diameter of each of the guide pins 14 and 26. The length of the through hole 52 is larger than the outer dimension of the pair of guide pins 14 and the outer dimension of the pair of guide pins 26. The pair of guide pins 14 and the pair of guide pins 26, therefore, can be inserted into the through holes 52. The separation members 50 can be moved in the lengthwise directions of the through holes 52 in a state in which the guide pins 14 and 26 are inserted into the through holes 52. That is, the guide pins 14 and 26 are configured to guide the separation members 50 in the lengthwise directions of the through holes 52. In this embodiment, the separation apparatus 1 includes twelve separation members 50 of which the number is the same as the number of each of the sets of the pair of guide pins 14 and the sets of the pair of guide pins 26.

[Separation Method]

Subsequently, a method of separating (dividing) the laminated core 100 into the respective core pieces by using the separation apparatus 1 will be described with reference to FIGS. 5 to 8.

First, the guide shafts 30 are inserted into the through holes 12 of the holding plate 10, and the restricting members 40 are inserted into the through holes 13 of the holding plate 10. Next, the respective separation members 50 are placed on the holding plate 10 so that the sets of the pair of guide pins 14 are inserted into the respective through holes 52. The guide shafts 30, the restricting members 40 and the separation members 50 are mounted on the holding plate 10 in this way. Meanwhile, an order in which the guide shafts 30, the restricting members 40 and the separation members 50 are mounted on the holding plate 10 is not particularly limited and may be an arbitrary order.

Figure 5:
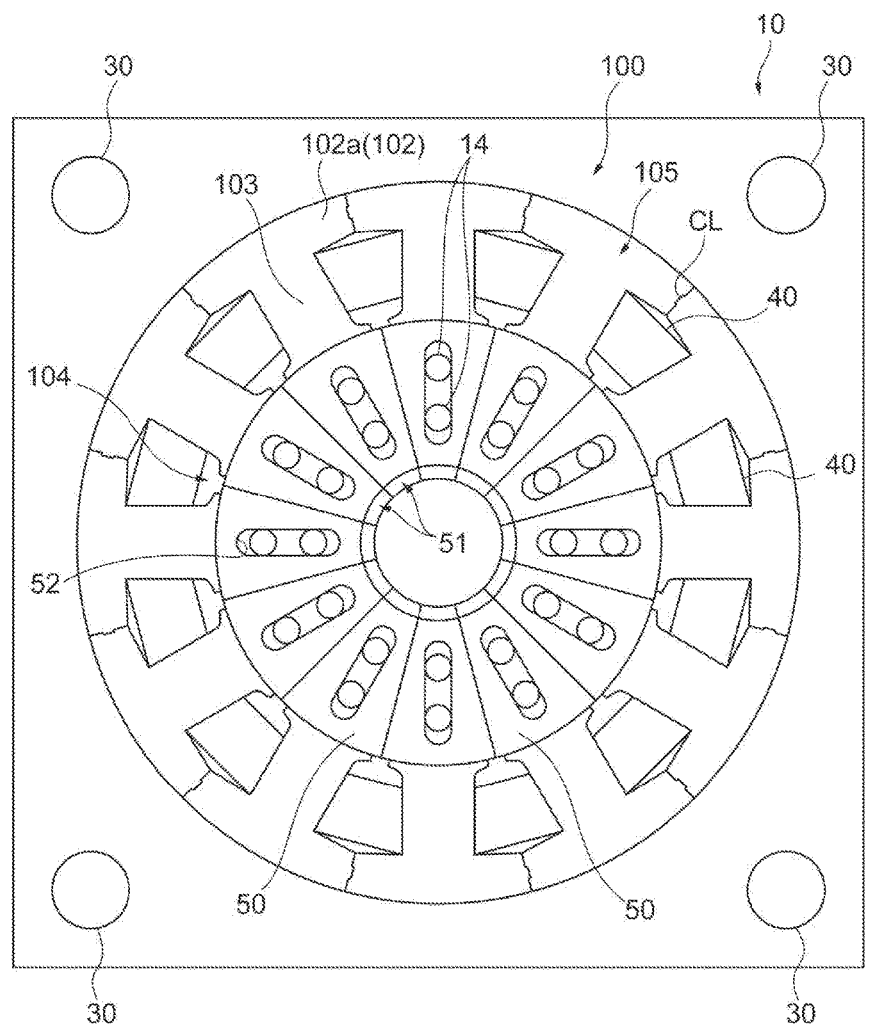
FIG. 5 is a top view illustrating a state in which the laminated core mounted on the separation apparatus is not yet separated and from which an actuator is omitted.

Next, the laminated core 100 is placed on the holding plate 10 as illustrated in FIG. 5. At this time, the restricting members 40 are inserted into the slots 104, respectively. The movement of the laminated core 100 in the circumferential direction of the laminated core 100, therefore, is restricted by the restricting members 40. That is, the restricting members 40 are configured to restrict the movement of the laminated core 100 in the circumferential direction. Further, at this time, the respective separation members 50 are received in the through hole 101 of the laminated core 100 and the inner peripheral surface of each tooth portion 103 is in contact with the outer peripheral surface of each separation member 50. The respective separation members 50, therefore, are disposed so as to correspond to the respective tooth portions 103 one to one. Accordingly, the respective separation members 50 are disposed so as to be arranged in the circumferential direction of the laminated core 100. The inner peripheral surface 51 of each separation member 50 is inclined with respect to the central axis Ax of the laminated core 100. The inclination angle of the inner peripheral surface 51 with respect to the central axis Ax may be in the range of, for example, about 2° to 10°.

Next, as illustrated in FIG. 6, the actuator 20 is placed on the holding plate 10 and the laminated core 100. At this time, the guide shafts 30 are inserted into the through holes 24 and the restricting members 40 are inserted into the through holes 25, respectively. Further, a set of a pair of guide pins 26 is inserted into each through hole 52 at this time. Furthermore, the peripheral surface (conical surface) of the pressing shaft 23 is in contact with the inner peripheral surfaces 51 of the respective separation members 50 at this time.

Figure 7:
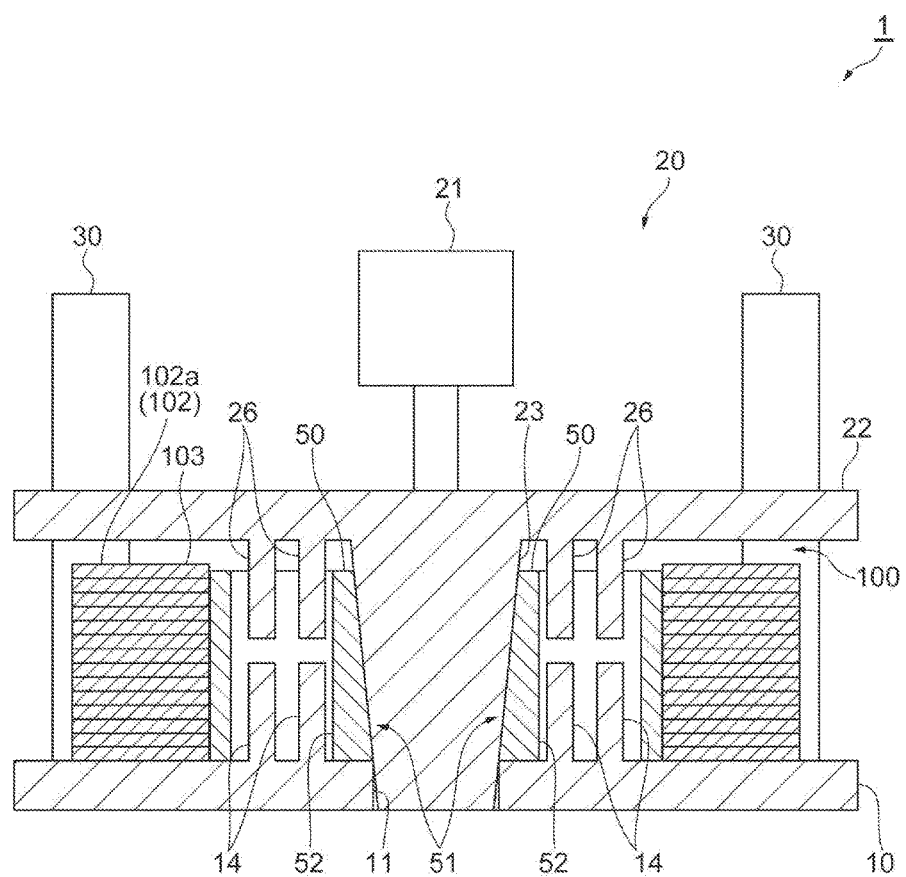
FIG. 7 is a cross-sectional view illustrating a state in which the laminated core mounted on the separation apparatus has been separated and which is viewed from the side.

After that, the pressing machine 21 is operated and pushes the upper plate 22 so that the upper plate 22 approaches the holding plate 10. At this time, the pressing shaft 23 is pressed against the respective separation members 50 by the pressing machine 21 while the peripheral surface (conical surface) of the pressing shaft 23 is in contact with the inner peripheral surfaces 51 of the respective separation members 50 as illustrated in FIG. 7. The peripheral surface (conical surface) of the pressing shaft 23, therefore, applies an outward force to the inner peripheral surfaces 51 while sliding on the inner peripheral surfaces 51. Accordingly, each separation member 50 is moved outward in the radial direction of the laminated core 100 while guided by the pair of guide pins 14 and the pair of guide pins 26. Since the outer peripheral surfaces of the separation members 50 are in contact with the inner peripheral surfaces of the tooth portions 103, respectively, each separation member 50 moved outward in the radial direction of the laminated core 100 applies an outward force in the radial direction of the laminated core 100 to each tooth portion 103. As a result, the laminated core 100 is divided into the respective core pieces 105 as illustrated in FIG. 8. Meanwhile, a pressing force applied to the upper plate 22 by the pressing machine 21 may be, for example, about 1000 kgf. The moving distance of the upper plate 22 pushed by the pressing machine 21 so as to approach the holding plate 10 may be in the range of, for example, about 8 mm to 12 mm, and the moving distance of each separation member 50 moved outward in the radial direction of the laminated core 100 may be in the range of, for example, about 0.3 mm to 1.0 mm.

[Effect]

Incidentally, a first method for forming a plurality of core pieces is known. The first method includes stacking and fastening a plurality of electromagnetic steel sheets, which are processed in the shape of a core pieces. However, since the core pieces are individually formed one by one in this case, efforts and time tend to be required for the manufacture of the core pieces. Further, since a little portion of the electromagnetic steel sheet can be used as a core piece, a loss of a material is caused.

Accordingly, a second method for forming a plurality of core piece is known. The second method includes forming a plurality of cutting lines on an electromagnetic steel sheet, obtaining workpieces having the cutting lines by punching the electromagnetic steel sheet having the cutting lines so that the workpieces have the shape of a laminated core, obtaining an annular laminated core by stacking and fastening the plurality of workpieces, and separating the obtained laminated core at the cutting lines. Here, the cutting lines are obtained by, for example, cutting-and-bending the electromagnetic steel sheet, returning the cut-and-bent portions of electromagnetic steel sheet to original positions by pushback processing, and then pressing the cut-and-bent portions into the original electromagnetic steel sheet. Accordingly, a laminated core in a state in which the core pieces are fitted to each other at the cutting line is formed. According to this method, it is possible to obtain a plurality of core pieces by only dividing the laminated core at the cutting lines after forming the laminated core first.

However, since the core pieces are fitted to each other at the cutting line as described above, a worker cannot divide the laminated core into core pieces by only applying a force to cutting line portions with a hand. Therefore, since the worker should divide the laminated core into core pieces one by one by using a predetermined tool, efforts and time are required for the division of the laminated core into core pieces.

However, in the above-mentioned embodiment, the respective separation members 50 are moved outward in the radial direction by the actuator 20 (the pressing machine 21 and the pressing shaft 23). Accordingly, an outward force in the radial direction is applied to the laminated core 100 through the respective separation members 50. An outward force in the radial direction, therefore, is substantially simultaneously and substantially uniformly applied to the respective core pieces 105 of the laminated core 100 by the respective separation members 50. Thus, the laminated core 100 is substantially simultaneously divided into the respective core pieces 105 only by moving the respective separation members 50 by the actuator 20. As a result, the laminated core 100 can be easily divided into the core pieces 105 in a short time. Moreover, when a force in the direction along the central axis Ax of the laminated core 100 is applied to the laminated core 100, there is a concern that the workpieces 200 may be peeled off. However, since an outward force in the radial direction of the laminated core 100 is applied to the laminated core 100 in this embodiment, the workpieces 200 are hardly peeled off during the division of the laminated core 100.

In this embodiment, the pressing machine 21 presses the upper plate 22 (the pressing shaft 23) against the respective separation members 50 in a state in which the conical surface of the pressing shaft 23 is in contact with the inner peripheral surfaces 51 of the respective separation members 50. The peripheral surface (conical surface) of the pressing shaft 23, therefore, applies an outward force to the inner peripheral surfaces 51 while sliding on the inner peripheral surfaces 51. Accordingly, the respective separation members 50 can be moved outward in the radial direction by a very simple structure.

In this embodiment, a set of the pair of guide pins 14 and a set of a pair of guide pins 26 are inserted into the through hole 52 of each separation member 50. Each separation member 50, therefore, is guided in the extending direction of the through hole 52 by the set of a pair of guide pins 14 and the set of a pair of guide pins 26 that are inserted into the through hole 52. Accordingly, the respective separation members 50 can be reliably guided in the radial direction by a very simple structure. Further, each separation member 50 can be more reliably moved outward in the radial direction by the guide pins 14 and 26. An outward force in the radial direction more effectively, therefore, acts on the laminated core 100. Accordingly, the laminated core 100 can be more smoothly divided into the core pieces 105.

In this embodiment, the separation apparatus 1 includes the restricting members 40 each of which is disposed between the tooth portions 103 of the adjacent core pieces 105, that is, in the slot 104. The wobble of the laminated core 100 in the circumferential direction, therefore, is suppressed by the restricting members 40. Accordingly, an outward force in the radial direction effectively acts on each core piece 105 from each separation member 50. As a result, the laminated core can be more smoothly divided into the core pieces.

In this embodiment, the respective separation members 50 are disposed so as to correspond to the respective tooth portions 103 one to one. An outward force in the radial direction, therefore, is more uniformly applied to the respective core pieces 105 of the laminated core 100 by the respective separation members 50. Accordingly, the intensive application of a force to a specific core piece 105 is suppressed. As a result, the laminated core 100 can be much more smoothly divided into the core pieces 105.

Other Embodiments

The embodiment according to the disclosure has been described above in detail, but various modifications may be added to the above-mentioned embodiment without departing from the scope of the invention. For example, the inner rotor type laminated core 100 where a rotor is disposed on the inside of a stator has been described in the above-mentioned embodiment, but the invention may also be applied to an outer rotor type laminated core where a rotor is disposed on the outside of a stator.

The pressing shaft 23 has been operated on the laminated core 100 from above in the above-mentioned embodiment, but the pressing shaft 23 may be operated on the laminated core 100 in other directions (for example, from below).

The restricting members 40 have been inserted into the respective slots 104 one by one in the above-mentioned embodiment, but at least one slot 104 may hold the restricting member 40. The separation apparatus 1 may not include the restricting members 40 and the restricting members 40 may not be inserted into any slot 104.

Upper and lower end portions of the guide shafts 30 may have a tapered shape so as to be easily inserted into the through holes 12 and 24. Upper and lower end portions of the restricting members 40 may have a tapered shape so as to be easily inserted into the through holes 13 and 25. Tips of the guide pins 14 and 26 may have a tapered shape so as to be easily inserted into the through holes 52.

The respective separation members 50 have been disposed so as to correspond to the respective tooth portions 103 one to one in the above-mentioned embodiment, but the separation apparatus 1 may include at least two separation members 50. In this case, an outward force in the radial direction may not be fully uniformly applied to the respective core pieces 105 because two separation members 50 do not correspond to the respective tooth portions 50 one to one. However, even in this case, the laminated core 100 can be easily divided into the core pieces 105 in a short time. In this regard, as long as the movement of the laminated core 100 is restricted by at least one restricting member 40, it is easy for an outward force in the radial direction to be uniformly applied to the respective core pieces 105.

Since the respective separation members 50 received in the through hole 101 of the laminated core 100 is pushed outward in the radial direction of the laminated core 100 by the actuator 20, the laminated core 100 has been divided in the above-mentioned embodiment. However, the laminated core 100 may be pulled outward in the radial direction thereof in order to divide the laminated core 100.

The set of a pair of guide pins 14 and the set of a pair of guide pins 26 have been inserted into each through hole 52 in the above-mentioned embodiment, but ridges having a height shorter than that of the through hole 52 may be provided on each of the holding plate 10 and the upper plate 22 instead of the set of a pair of guide pins 14 and the set of a pair of guide pins 26. The ridges provided on the holding plate 10 radially extend outward from the through hole 11 (extend in the radial direction of the laminated core 100). The ridges provided on the upper plate 22 radially extend outward from the pressing shaft 23 (extend in the radial direction of the laminated core 100).

Groove portions may be provided on the holding plate 10 and the upper plate 22, and guide pins or ridges being insertable into the groove portions may be provided on the respective separation members 50. The groove portions provided on the holding plate 10 radially extend outward from the through hole 11 (extend in the radial direction of the laminated core 100). The groove portions provided on the upper plate 22 radially extend outward from the pressing shaft 23 (extend in the radial direction of the laminated core 100).

Instead of the through hole 52 of the separation member 50, an opening which does not pass through the separation member 50 may be provided on each of the surfaces of the separation member 50, the surfaces opposing the holding plate 10 and the upper plate 22.

Instead of the through holes 11 to 13 of the holding plate 10, openings which do not pass through the holding plate 10 may be provided on the holding plate 10.

Figure 9:
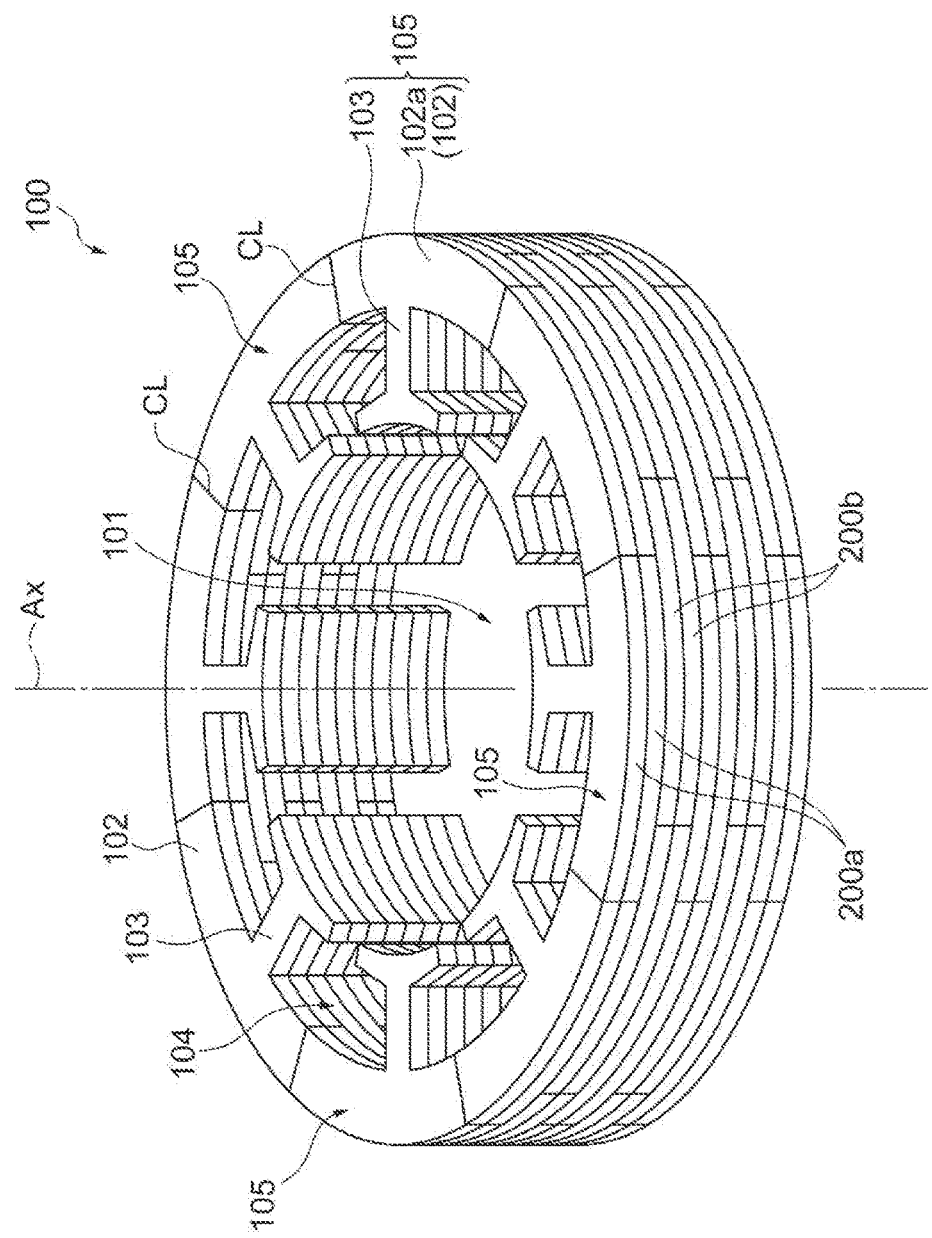
FIG. 9 is a perspective view illustrating another example of the laminated core.
Figure 10:
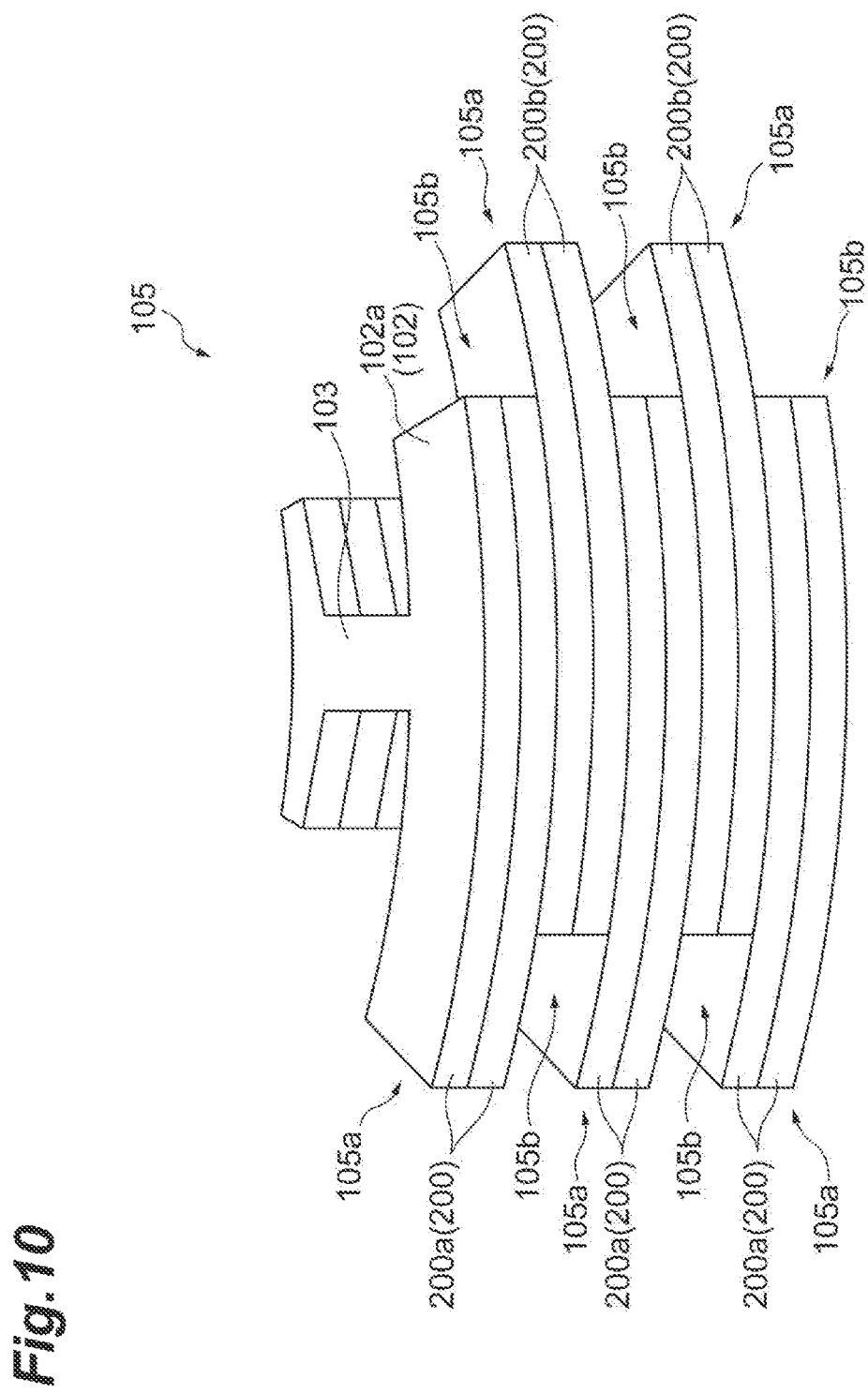
FIG. 10 is a top view of the laminated core of FIG. 9.

In the above-mentioned embodiment, the laminated core 100 has been configured so that all the cutting lines CL overlap each other in a lamination direction (the direction of the central axis Ax). However, as illustrated in FIGS. 9 and 10, all the cutting lines CL may not overlap in the lamination direction. Specifically, first sets including a plurality of workpieces 200a laminated so that cutting lines CL overlap each other in the lamination direction, and second sets including a plurality of workpieces 200b laminated so that cutting lines CL overlap each other in the lamination direction, may be alternately arranged in the lamination direction. At this time, the cutting lines CL of the workpieces 200a do not overlap the cutting lines CL of the workpieces 200b in the lamination direction. As illustrated in FIG. 10, side surfaces of the core pieces 105, therefore, are uneven surfaces on which protruding portions 105a and recessed portions 105b are alternately arranged.

The separation apparatus 1 including the actuator 20 (the pressing machine 21) has been described in the above-mentioned embodiment, but this invention may be applied to the separation jig 2 (see FIG. 3) that does not include the actuator 20 (the pressing machine 21). The separation jig 2 may include at least separation members 50. The separation jig 2 may include members (the holding plate 10, the upper plate 22, the guide shafts 30, and the restricting members 40) of the separation apparatus 1 other than the pressing machine 21, in addition to the separation members 50. In this case, the respective separation member 50 of the separation jig 2 may be moved outward in the radial direction of the laminated core 100 by an actuator 20 (a pressing machine 21) of another apparatus.

Indeed, the novel devices and methods described herein may be embodied in a variety of other forms; furthermore, various omissions, substitutions and changes in the form of the devices and methods described herein may be made without departing from the spirit of the inventions. The accompanying claims and their equivalents are intended to cover such forms or modification as would fall within the scope and spirit of the inventions.

Certain aspects, advantages, and novel features of the embodiment have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

What is claimed is:

1. A separation apparatus for a laminated core configured to separate an annular laminated core, which includes a plurality of core pieces each of which includes a yoke portion and a tooth portion extending from the yoke portion in a direction intersecting the yoke portion and is integrated by the temporary connection of the adjacent core pieces at end portions of the yoke portions, into the respective core pieces, the separation apparatus comprising:

a plurality of separation members that are movable in a radial direction of the laminated core and are disposed so as to be arranged in a circumferential direction of the laminated core; and an actuator that is configured to apply an outward force in the radial direction to the laminated core through the respective separation members by moving the respective separation members outward in the radial direction.

2. The separation apparatus according to claim 1, wherein each separation member has an inner peripheral surface which is positioned on the inside in the radial direction and is inclined with respect to a central axis of the laminated core, and the actuator includes
a shaft that includes a conical surface having a shape corresponding to the respective inner peripheral surfaces, and
a pressing machine that presses the shaft against the respective separation members in a state in which the conical surface is in contact with the respective inner peripheral surfaces.

3. The separation apparatus according to claim 1, further comprising:

a guide member that includes protrusions protruding from the surface thereof, wherein each separation member has a surface which faces the guide member and has an opening extending in the radial direction, and wherein the protrusions are inserted into the openings.

4. The separation apparatus according to claim 1, further comprising:

at least one restricting member which is disposed in a slot defined between the adjacent tooth portions of the core pieces.

5. The separation apparatus according to claim 1, wherein the respective separation members are disposed so as to correspond to the respective tooth portions one to one.

6. The separation apparatus according to claim 1, further comprising:

a shaft that is configured to be driven by the actuator, wherein each separation member has an inner peripheral surface which is inclined with respect to a central axis of the laminated core, and wherein the shaft includes a conical surface having a shape corresponding to the respective inner peripheral surfaces.

7. The separation apparatus according to claim 1, wherein the plurality of separation members are positioned in a space formed at a central portion of the annular laminated core.

8. A separation method for a laminated core comprising:

a first step of disposing a laminated core and a plurality of separation members so that the plurality of separation members are immovable in a radial direction of the laminated core and disposed so as to be arranged in a circumferential direction of the laminated core, wherein the annular laminated core includes a plurality of core pieces each of which includes a yoke portion and a tooth portion extending from the yoke portion in a direction intersecting the yoke portion and is integrated by the temporary connection of the adjacent core pieces at end portions of the yoke portions; and a second step of applying an outward force in the radial direction to the laminated core through the respective separation members by moving the respective separation members outward in the radial direction by an actuator.

9. The separation method according to claim 8,
wherein, in the second step, an outward force in the radial direction is applied to the laminated core through the respective separation members by moving the respective separation members outward in the radial direction by the actuator, the respective separation members being configured to be guided in the radial direction by a guide member.

10. The separation method according to claim 8,
wherein, in the second step, an outward force in the radial direction is applied to the laminated core through the respective separation members by moving the respective separation members outward in the radial direction by the actuator in a state in which the movement of the laminated core in the circumferential direction is restricted by at least one restricting member.

11. The separation method according to claim 8,
wherein the plurality of separation members are positioned in a space formed at a central portion of the annular laminated core.

\* \* \* \* \*